US 011125310B2

(12) United States Patent
Nolta (10) Patent No.: US 11,125,310 B2
(45) Date of Patent: Sep. 21, 2021

(54) SUPERCIRCUMROTATIONAL CAM

(71) Applicant: Hanon Systems, Daejeon (KR)

(72) Inventor: Jim Nolta, Canton, MI (US)

(73) Assignee: HANON SYSTEMS, Daejeon (KR)

( * ) Notice: Subject to any disclaimer, the term of this patent is extended or adjusted under 35 U.S.C. 154(b) by 48 days.

(21) Appl. No.: 15/806,484

(22) Filed: Nov. 8, 2017

(65) Prior Publication Data

US 2018/0142768 A1     May 24, 2018

Related U.S. Application Data

(60) Provisional application No. 62/425,882, filed on Nov. 23, 2016.

(51) Int. Cl.
| | |
|---|---|
| *F16H 37/12* | (2006.01) |
| *B60H 1/00* | (2006.01) |
| *F16H 25/18* | (2006.01) |
| *F16H 53/06* | (2006.01) |
| *F16H 53/02* | (2006.01) |

(52) U.S. Cl.
CPC ......... *F16H 37/12* (2013.01); *B60H 1/00842* (2013.01); *B60H 1/00857* (2013.01); *F16H 25/18* (2013.01); *F16H 53/025* (2013.01); *F16H 53/06* (2013.01)

(58) Field of Classification Search
CPC . B60H 1/00857; B60H 1/00842; F16H 37/12; F16H 53/06; F16H 53/025; F16H 25/18
USPC .............................. 74/53, 54, 55, 89; 454/160
See application file for complete search history.

(56) References Cited

U.S. PATENT DOCUMENTS

| | | | | |
|---|---|---|---|---|
| 412,703 A | * | 10/1889 | French et al. ......... | D05B 15/04 112/38 |
| 504,086 A | * | 8/1893 | Johnson ................... | F16H 25/14 74/55 |
| 780,130 A | * | 1/1905 | Salzer et al. ............ | F16H 25/14 74/55 |
| 862,085 A | * | 7/1907 | Lynam ................... | B31B 50/68 227/64 |
| 893,656 A | * | 7/1908 | Ringi ........................ | F01L 1/14 123/90.48 |

(Continued)

FOREIGN PATENT DOCUMENTS

| | | | | |
|---|---|---|---|---|
| CN | 105370831 A | | 3/2016 | |
| DE | 3744269 A1 | * | 7/1989 | ......... B60H 1/00857 |

(Continued)

*Primary Examiner* — Jake Cook
*Assistant Examiner* — T. Scott Fix
(74) *Attorney, Agent, or Firm* — Shumaker, Loop & Kendrick, LLP; James D. Miller (57) ABSTRACT

A kinematics system driven by an actuator comprises a cam configured to rotate about an axis of rotation thereof. A cam track formed in the cam extends circumferentially through more than 360 degrees of angular displacement relative to the axis of rotation of the cam. The kinematics system also comprises a follower having a pin slidably disposed in the cam track of the cam. The cam track extending circumferentially through more than 360 degrees of angular displacement relative to the axis of rotation of the cam establishes a minimized pressure angle formed between the pin of the follower and a surface of the cam track engaging the pin.

15 Claims, 6 Drawing Sheets

(56) References Cited

U.S. PATENT DOCUMENTS

| | | | | | |
|---|---|---|---|---|---|
| 1,117,749 | A | * | 11/1914 | Adrian | F16H 19/025 74/25 |
| 1,379,846 | A | * | 5/1921 | Benson | F16H 53/08 74/55 |
| 1,385,002 | A | * | 7/1921 | Hall | F16H 53/08 74/55 |
| 1,921,897 | A | * | 8/1933 | Topham | D05B 15/08 112/38 |
| 1,979,195 | A | * | 10/1934 | Govare | F16H 53/08 74/55 |
| 1,980,527 | A | * | 11/1934 | Hewton | D03D 49/60 139/190 |
| 2,070,633 | A | * | 2/1937 | Topham | F16H 25/16 74/53 |
| 2,692,509 | A | * | 10/1954 | Gilbson | B23Q 5/34 74/53 |
| 2,706,415 | A | * | 4/1955 | Curtis | B23Q 5/34 74/53 |
| 2,797,589 | A | * | 7/1957 | Chaveneaud | F16H 27/08 74/435 |
| 3,142,131 | A | * | 7/1964 | Von Rabenau | A63H 13/15 33/18.2 |
| 3,442,146 | A | * | 5/1969 | Simpson | F16H 27/04 74/435 |
| 3,529,480 | A | * | 9/1970 | Kaspareck | F16H 27/02 475/180 |
| 3,990,674 | A | * | 11/1976 | Schattenberg | B60H 1/00857 251/75 |
| 4,069,724 | A | * | 1/1978 | Sobotta | F16H 25/16 74/54 |
| 4,570,500 | A | * | 2/1986 | Richter | B23Q 5/341 74/54 |
| 4,876,794 | A | * | 10/1989 | Myers | B25B 7/12 30/252 |
| 6,431,266 | B1 | * | 8/2002 | Han | B60H 1/00842 165/204 |
| 6,702,008 | B1 | * | 3/2004 | Hibino | B60H 1/00842 165/202 |
| 7,563,159 | B2 | | 7/2009 | Newman et al. | |
| 7,793,706 | B2 | | 9/2010 | Archibald et al. | |
| 2002/0117296 | A1 | * | 8/2002 | Smith | B60H 1/00028 165/202 |
| 2002/0195227 | A1 | * | 12/2002 | Ito | B60H 1/00842 165/41 |
| 2007/0184774 | A1 | * | 8/2007 | Balzo | B60H 1/00671 454/143 |
| 2009/0301238 | A1 | * | 12/2009 | Wintsch | G05G 5/04 74/89.17 |
| 2012/0318079 | A1 | * | 12/2012 | Weber | B60H 1/0065 74/54 |
| 2013/0098181 | A1 | * | 4/2013 | Thiery | F16H 21/52 74/53 |
| 2014/0083237 | A1 | * | 3/2014 | Kim | G05G 1/10 74/501.6 |
| 2016/0084388 | A1 | | 3/2016 | Spryshak | |
| 2016/0288614 | A1 | * | 10/2016 | Wild | B60H 1/00842 |
| 2019/0232756 | A1 | * | 8/2019 | Matsuda | B60H 1/00857 |

FOREIGN PATENT DOCUMENTS

| | | | |
|---|---|---|---|
| DE | 102016220124 A1 | 4/2017 | |
| EP | 1598222 A2 * | 11/2005 | G05G 7/04 |
| FR | 2720981 A1 * | 12/1995 | B60H 1/00857 |
| JP | 62220759 A | 9/1987 | |
| JP | 04185952 A | 7/1992 | |
| JP | 2006046651 A | 2/2006 | |
| JP | 2014109381 A | 6/2014 | |
| KR | 20040101864 A | 12/2004 | |

* cited by examiner

SUPERCIRCUMROTATIONAL CAM

CROSS-REFERENCE TO RELATED APPLICATION

This patent application claims priority to U.S. Provisional Patent Application Ser. No. 62/425,882, filed on Nov. 23, 2016, the entire disclosure of which is hereby incorporated herein by reference.

FIELD OF THE INVENTION

The present invention relates to a kinematics system for operating control doors in a heating, ventilating, and air conditioning (HVAC) system, and more particularly to a cam of the kinematics system of the HVAC system.

BACKGROUND OF THE INVENTION

Heating, ventilating, and air conditioning (HVAC) systems often include three or more control doors to control a flow and/or temperature of air through the HVAC system. For example, with reference to FIG. 1, an exemplary HVAC system having multiple control doors for controlling a flow of air through the HVAC system is disclosed. The HVAC system may include a temperature control door 4 and at least three mode control doors 5, 6, 7. The temperature control door 4 is adjustable to a plurality of positions for controlling a distribution of air flowing through or bypassing a heater core 8 after the air has passed through an evaporator 9 disposed upstream of the temperature door 4. Any air flowing through the heater core 8 is then recombined with any air bypassing the heater core 8 in a mixing section 10 disposed downstream of the temperature door 4. The mode control doors 5, 6, 7 are configured to selectively control the flow of the mixed air originating from the mixing section 10 through one of a plurality of vent conduits 11, 12, 13, wherein each of the vent conduits 11, 12, 13 leads to one or more vents disposed within a passenger compartment of the motor vehicle. A first mode control door 5 selectively controls a distribution of the air from the mixing section 10 flowing through a first vent conduit 11, a second mode control door 6 selectively controls a distribution of the air from the mixing section 10 flowing through a second vent conduit 12, and a third mode control door 7 selectively controls a distribution of the air from the mixing section 10 flowing through a third vent conduit 13. The first vent conduit 11 of the HVAC system may lead to one or more defrost or demist vents configured to remove condensation or frost formed on the front, side, or rear windows of the motor vehicle, the second vent conduit 12 may lead to one or more vents directed towards a front passenger area of the passenger compartment, and the third vent conduit 13 may lead to one or more vents directed towards a rear passenger area of the passenger compartment, as one non-limiting example. Alternatively, one of the vent conduits 11, 12, 13 may be directed only towards the console vents of the passenger compartment while another of the vent conduits 11, 12, 13 may be directed only towards the floor vents of the passenger compartment. Still, in other embodiments, one of the vent conduits 11, 12, 13 may be directed only towards a driver side of the passenger compartment while another of the vent conduits 11, 12, 13 is only directed towards a passenger side of the passenger compartment.

Many HVAC systems presently include the ability of the passenger to select a temperature of the air delivered by the HVAC system as well as one or more operational modes including the distribution of the air to a combination of different vents disposed within the passenger compartment. As a result, there exist situations wherein a plurality of the control doors are actuated simultaneously to new positions in order to change the temperature of the air or to redistribute the air to different vents within the passenger compartment in accordance with the selection of the passenger.

Figure 1:
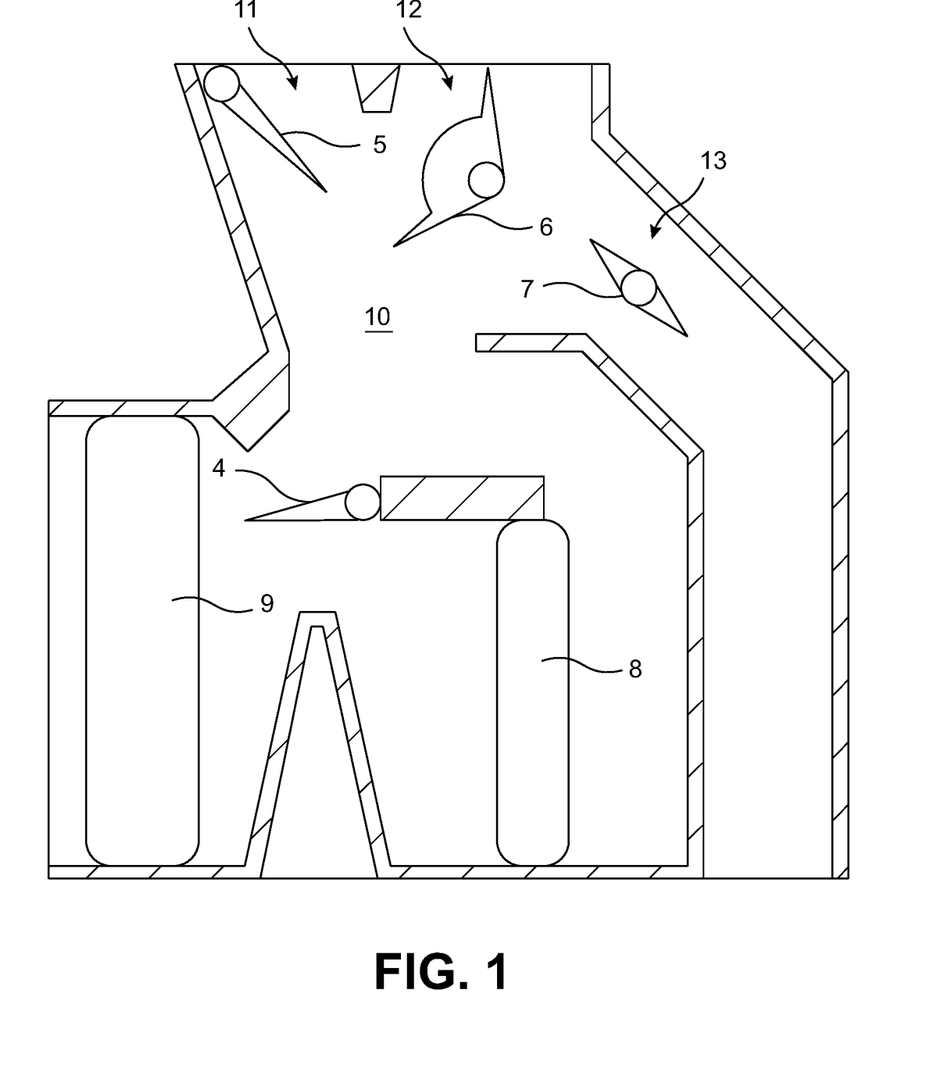
FIG. 1 is a cross-sectional elevational view of an exemplary HVAC system having a plurality of control doors.

One method of simultaneously controlling a rotational position of each of the control doors 4, 5, 6, 7 illustrated in FIG. 1 includes dedicating an independent actuator to each respective control door 4, 5, 6, 7. However, the use of an independent actuator for each control door may be prohibitively expensive.

Another solution includes the use of a single actuator for controlling the plurality of the control doors 4, 5, 6, 7 simultaneously, wherein suitable kinematics components are provided between the single actuator and each of the corresponding control doors 4, 5, 6, 7 for selectively controlling the rotational position of each of the control doors 4, 5, 6, 7. However, the single actuator may have limited available torque due to the package requirements and power demands of other components of the motor vehicle. In order to accommodate the limited available torque of the actuator, the kinematics components linking the actuator to each of the control doors 4, 5, 6, 7 may be selected to most efficiently transfer the motion of the actuator to each of the control doors 4, 5, 6, 7.

One method of efficiently transferring the motion of the actuator to the control doors 4, 5, 6, 7 includes the use of a cam and follower assembly having a pressure angle smaller than a standard recommended maximum. The pressure angle is defined as an angle formed between a direction of force of the cam acting on the follower and a direction of the resulting motion of the follower as a result of the force of the cam on the follower.

Due to complexity, limited torque requirements of the actuator, and rotation time requirements of the control doors, existing kinematics systems utilize cams with rotations that are limited to a maximum of 300 degrees. The limit of the cam to rotate through a maximum of 300 degrees limits the ability to reduce the pressure angle present between the cam and the follower during rotation of the cam. This occurs because the position of the follower relative to the cam is determined by a distance of the engaging surface of the cam from an axis of rotation thereof. Some portions of the engaging surface of the cam having a constant radius of curvature with respect of the axis of rotation thereof tend to not move the position of the follower during rotation of the cam, while other portions of the engaging surface having a variable radius of curvature with respect of the axis of rotation of the cam tend to cause a prescribed motion of the follower away from or towards the axis of rotation of the cam. Thus, the portions of the engaging surface of the cam causing the prescribed motion of the follower include the engaging surface deviating from the portions of the engaging surface having the constant radius of curvature to one of slope radially inwardly towards the axis of rotation thereof or slope radially outwardly away from the axis of rotation thereof.

By limiting the range of angular motion of the cam to 300 degrees, the sloped portions of the engaging surface of the cam must change in shape more quickly to result in the same motion of the follower in comparison to a cam having a greater range of angular rotation. The increased rate of change in the shape of the engaging surface of the cam thus results in increased pressure angles formed between the cam and the follower as the force applied by the engaging surface of the cam to the follower is similarly inclined with respect to the desired direction of motion of the follower.

Due to these requirements, it may be common for HVAC systems to employ center pivot style doors that require less torque to rotate in comparison to end pivot style doors or barrel style doors. With renewed reference to FIG. 1, the mode control door 7 is shown as a center pivot style door having an axis of rotation and a pair of substantially plate-like radially outwardly extending door panels, the temperature control door 4 and the first mode control door 5 are shown as end pivot style doors having a single plate-like door panel pivoting about an axis of rotation disposed at an end thereof, and the second mode control door 6 is shown as a barrel style door having a pair of plate-like door panels connected by a segment of a substantially cylindrically shaped surface. However, center pivot doors generally limit the ability to optimize HVAC airflow, the temperature of the air, and the noise, vibration, and harshness (NVH) performance of the HVAC system in comparison to the end pivot style doors or the barrel style doors.

Accordingly, it would be desirable to provide an actuator and kinematics system of an HVAC system including a cam that has rotation angles greater than 360 degrees that maintains desired control of the doors while maintaining design robustness of the remainder of the kinematics system.

SUMMARY OF THE INVENTION

In concordance and agreement with the present invention, an actuator and kinematics system of an HVAC system including a cam that has rotation angles greater than 360 degrees that maintains desired control of the doors and package requirements while decreasing cost and components of the actuator and kinematics system has surprisingly been discovered.

In one embodiment, a cam for use in a kinematics system driven by an actuator comprises a plate configured to rotate about an axis of rotation thereof. A cam track is formed in the plate and extends circumferentially through more than 360 degrees of angular displacement relative to the axis of rotation of the plate.

In another embodiment, a kinematics system driven by an actuator comprises a cam configured to rotate about an axis of rotation thereof. A cam track is formed in the cam and extends circumferentially through more than 360 degrees of angular displacement relative to the axis of rotation of the cam. The kinematics system further comprises a follower having a pin slidably disposed in the cam track of the cam.

In yet another embodiment, a heating, ventilating, and air conditioning system of a motor vehicle comprises a plurality of control doors, an actuator, and a cam for transferring torque generated by the actuator to at least one of the control doors. The cam is configured to rotate about an axis of rotation thereof. A cam track is formed in the cam and extends circumferentially through more than 360 degrees of angular displacement relative to the axis of rotation of the cam. A follower has a pin slidably disposed in the cam track of the cam.

BRIEF DESCRIPTION OF THE DRAWINGS

The above objects and advantages of the invention, as well as others, will become readily apparent to those skilled in the art from reading the following detailed description of a preferred embodiment of the invention when considered in the light of the accompanying drawings, in which.

DETAILED DESCRIPTION

The following detailed description and appended drawings describe and illustrate various exemplary embodiments of the invention. The description and drawings serve to enable one skilled in the art to make and use the invention, and are not intended to limit the scope of the invention in any manner.

Figure 2:
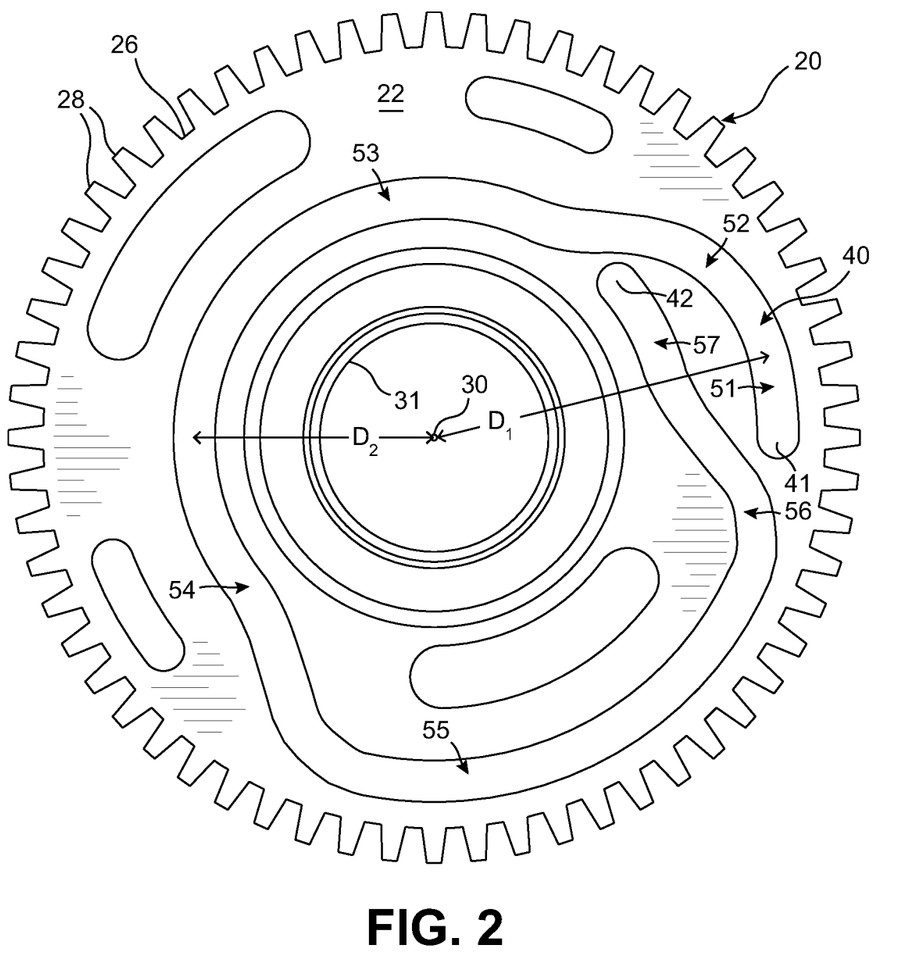
FIG. 2 is a front elevational view of a cam of a kinematics system according to one embodiment of the invention.

FIG. 2 illustrates a cam 20 forming a portion of a kinematics system for use in an HVAC system of a motor vehicle according to one embodiment of the invention. The cam 20 may form a portion of a kinematics system configured for controlling the respective positions of each of a plurality of control doors forming a portion of an HVAC system of a motor vehicle. The cam 20 may for example form a component of a kinematics system used to rotate any combination of the control doors 4, 5, 6, 7 shown and described with reference to the HVAC system shown in FIG. 1, as desired. However, it should be understood by one skilled in the art that the current invention may be adapted for use in any form of kinematics system associated with any mechanical system without departing from the scope of the present invention. It should further be understood that the cam 20 may be adapted for use with any variety of mechanical components normally used to form a kinematics system, including various links, sliding joints, gears, arms, pulleys, additional cams, etc., without departing from the scope of the present invention.

Figure 6:
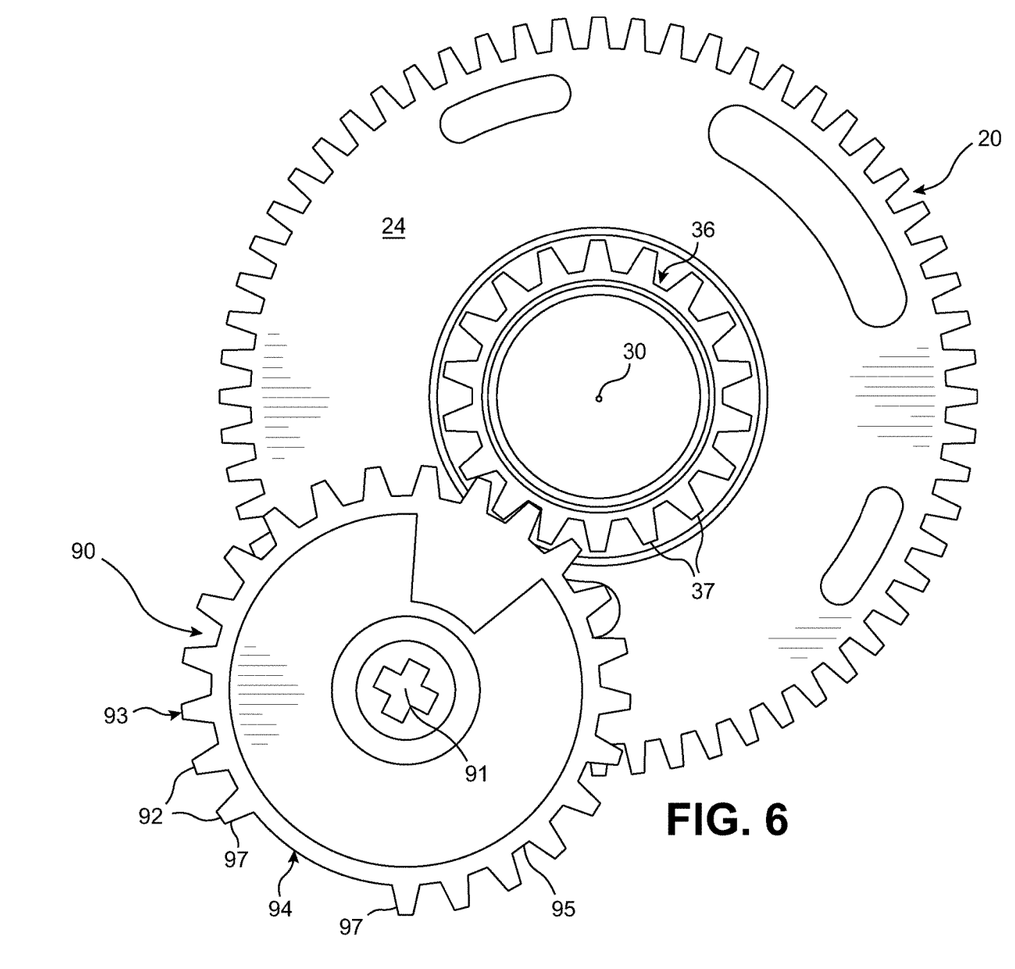
FIG. 6 is a rear elevational view of the cam of FIG. 2 engaging a secondary gear of the kinematics system.

The cam 20 is substantially disk shaped and substantially plate-like and includes a first major surface 22 and an oppositely arranged second major surface 24 (FIG. 6). The cam 20 is substantially circular and includes an outer circumferential surface 26 connecting the first major surface 22 to the second major surface 24. The outer circumferential surface 26 is shown in FIG. 1 as including a plurality of teeth 28 extending radially outwardly therefrom. The teeth 28 may be configured for engaging a secondary component (not shown) of the kinematics system such as a secondary gear for transferring rotational motion to or from the cam 20. The cam 20 may also be formed devoid of the teeth 28, as desired.

The cam 20 rotates about a centrally located fixed axis of rotation 30. In some embodiments, the axis of rotation 30 may be centrally located within an aperture 31 formed through the cam 20 from the first major surface 22 to the second major surface 24 thereof for receiving a shaft, about which the cam 20 is rotated. Alternatively, in other embodiments, the aperture 31 may be configured to receive another rotary component of the kinematics system configured to transfer motion to or from the cam 20 during rotation of the cam 20 about the axis of rotation 30 thereof. In still other embodiments, the axis of rotation 30 of the cam 20 may be formed by a shaft formed integrally with the remainder of the cam 20 and extending from the cam 20 in an axial direction. One skilled in the art should appreciate that the cam 20 may be used in a variety of different contexts and in conjunction with a variety of different arrangements of kinematics components without departing from the scope of the present invention, so long as the axis of rotation 30 remains substantially stationary with respect to the remaining components of the kinematics system.

The cam 20 may be driven to rotate about the axis of rotation 30 thereof by any form of suitable actuator (not shown). The actuator may for example be a stepper motor configured to transfer the rotary motion of a rotor to the cam 20, as well as any additional components of the associated kinematics system having the cam 20. The torque generated by the actuator may be transferred to the cam 20 by any suitable means known in the art. The actuator may for example be used to drive a shaft received within the aperture 31 of the cam 20 or a shaft extending axially from the axis of rotation 30 of the cam 20. Alternatively, the cam 20 may receive rotational motion via the teeth 28 formed on the outer circumferential surface 26 of the cam 20. Additional kinematics components may be present between the actuator and the cam 20 for controlling a timing of the rotation of the cam 20, as is described in greater detail hereinafter with reference to FIG. 6.

Figure 3:
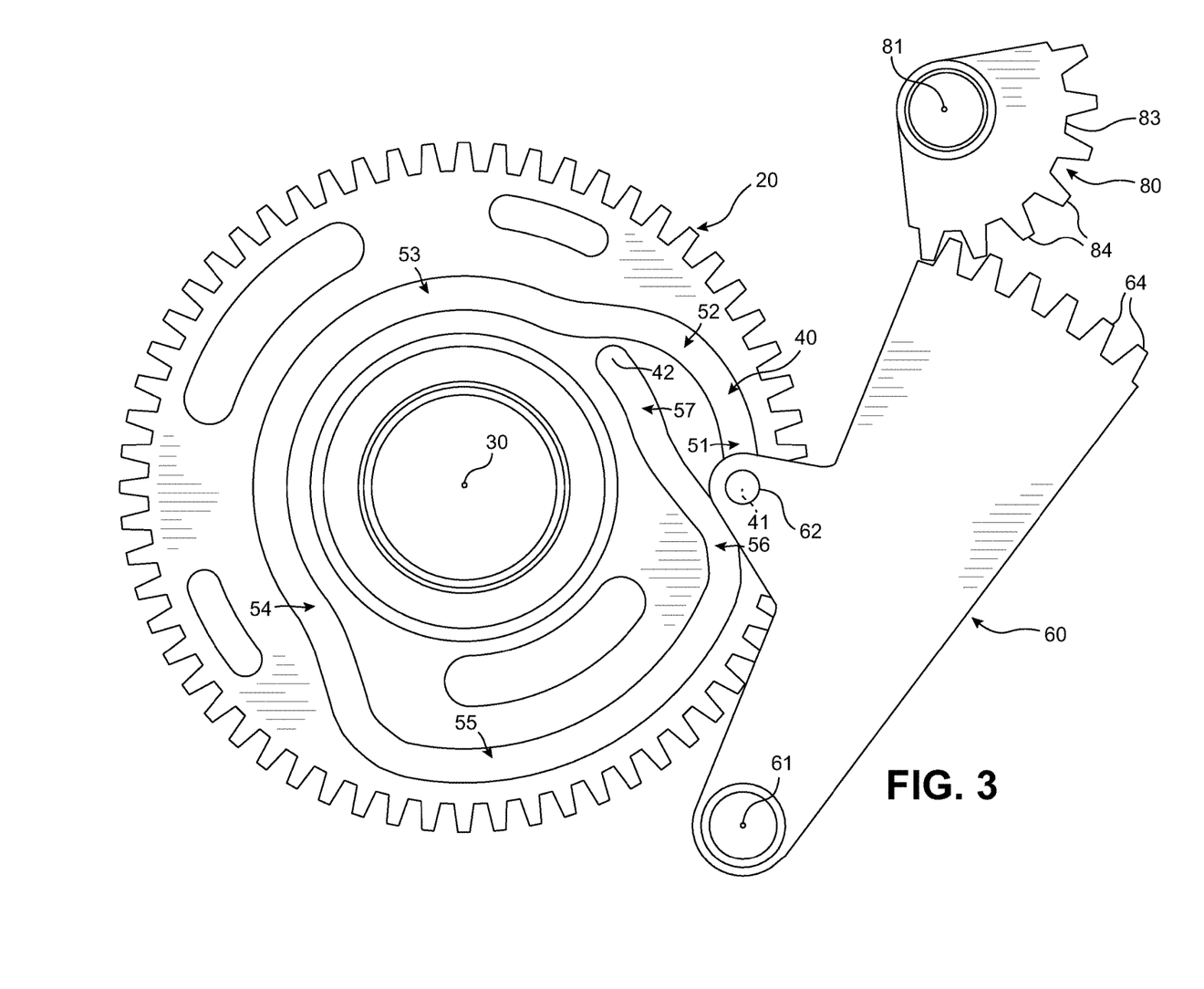
FIG. 3 is a front elevational view showing a rotating follower operatively engaging the cam of FIG. 2.
Figure 4:
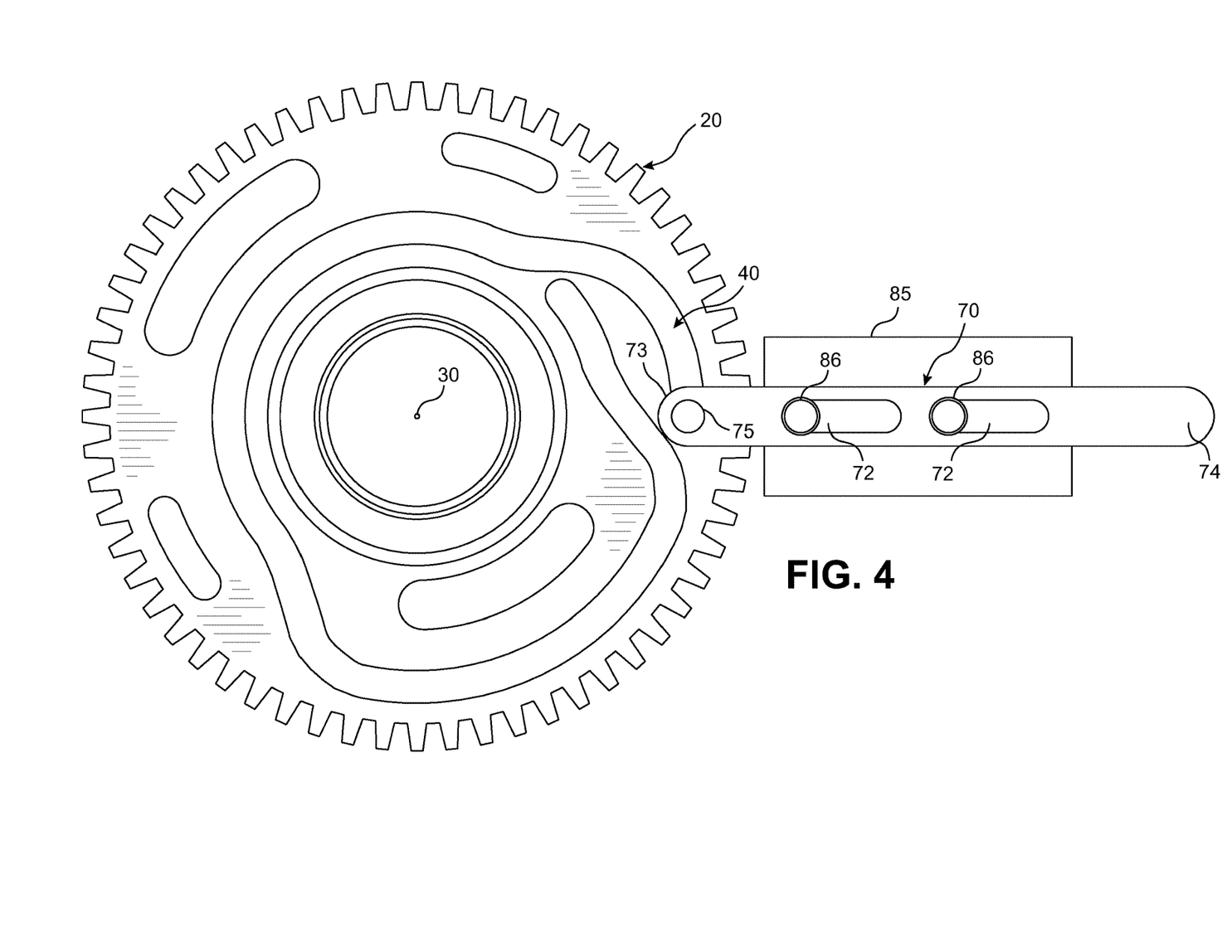
FIG. 4 is a front elevational view showing a sliding follower operatively engaging the cam of FIG. 2.

The cam 20 includes a cam track 40 configured for receiving a portion of a follower 60, 70 (illustrated in FIGS. 3 and 4). The cam track 40 may be formed as a slot having a substantially constant width as the cam track 40 extends in a circumferential direction of the cam 20 relative to the axis of rotation 30 thereof from a first end 41 to a spaced apart second end 42, wherein the circumferential direction of the cam 20 refers to a direction of extension encircling or surrounding the axis of rotation 30 of the cam 20. The cam track 40 may be formed as an indentation formed in one of the first major surface 22 or the second major surface 24 or the cam track 40 may be formed as an opening extending through a thickness of the cam 20 from the first major surface 22 to the second major surface 24 thereof, as desired.

As shown in FIG. 2, the cam track 40 includes a plurality of segments having a constant distance from the axis of rotation 30 as the cam track 40 extends circumferentially from the first end 41 to the second end thereof 42. The cam track 40 further includes a plurality of segments having a varying distance from the axis of rotation 30 as the cam track 40 extends circumferentially from the first end 41 to the second end 42 thereof. The cam track 40 illustrated in FIG. 2 includes a first segment 51 having the first end 41 and including the cam track 40 spaced a constant first distance $D_1$ from the axis of rotation 30 of the cam 20. A second segment 52 formed adjacent the first segment 51 includes the cam track 40 extending at least partially in a radially inward direction until an end of the second segment 52 opposite the first segment 51 is spaced from the axis of rotation 30 by a second distance D2, wherein the distance $D_2$ is smaller than the distance $D_1$. A third segment 53 formed adjacent the second segment 52 includes the cam track 40 spaced the second distance $D_2$ from the axis of rotation 30 as the cam track 40 continues to extend toward the second end 42 thereof. A fourth segment 54 formed adjacent the third segment 53 includes the cam track 40 extending at least partially in a radially outward direction until an end of the fourth segment 54 opposite the third segment 53 is spaced the first distance $D_1$ from the axis of rotation 30. A fifth segment 55 formed adjacent the fourth segment 54 includes the cam track 40 spaced the first distance $D_1$ from the axis of rotation 30 as the cam track 40 continues towards the second end 42 thereof. A sixth segment 56 formed adjacent the fifth segment 55 includes the cam track 40 extending at least partially in the radially inward direction until an end of the sixth segment 56 opposite the fifth segment 55 is spaced from the axis of rotation 30 by the second distance $D_2$. Finally, a seventh segment 57 is formed adjacent the sixth segment 56 and includes the cam track 40 spaced the distance $D_2$ from the axis of rotation 30 until the cam track 40 terminates at the second end 42 thereof.

The cam track 40 illustrated in FIG. 2 extends circumferentially through about 400 degrees of angular displacement with respect of the axis of rotation 30 of the cam 20 as the cam track 40 extends from the first end 41 to the second end 42 thereof. The cam track 40 extending through more than 360 degrees of angular displacement of the cam 20 causes at least a portion of one of the segments 51, 52, 53, 54, 55, 56, 57 of the cam track 40 to be disposed radially outwardly or radially inwardly with respect of at least a portion of another one of the segments 51, 52, 53, 54, 55, 56, 57 of the cam track 40, thereby causing the portions of the segments 51, 52, 53, 54, 55, 56, 57 to overlap in the radial direction of the cam 20. In other words, at least one line extending radially outwardly from the axis of rotation 30 of the cam 20 will pass through at least two of the segments 51, 52, 53, 54, 55, 56, 57 of the cam track 40 due to the overlap present between the at least two segments 51, 52, 53, 54, 55, 56, 57. In the illustrated embodiment, the cam track 40 includes about 40 degrees of overlap including the first segment 51 overlapping a portion of the sixth segment 56 and the second segment 52 overlapping a portion of the seventh segment 57.

FIGS. 3 and 4 illustrate two exemplary arrangements of kinematics components for use with the cam 20, wherein FIG. 3 illustrates a rotating follower 60 and FIG. 4 illustrates a sliding follower 70. The followers 60, 70 are used to translate the rotational motion of the cam 20 to one of a rotational motion or a translating motion, as desired.

The rotating follower 60 is configured to rotate about a fixed axis of rotation 61 thereof. A pin 62 of the rotating follower 60 is spaced from the axis of rotation 61 thereof and is configured to be received within the cam track 40 of the cam 20. The pin 62 may be formed to frictionally engage and slide within the cam track 40 as the pin 62 traverses the cam track 40 or the pin 62 may be configured as a roller or bearing type structure configured to rotate or roll the pin 62 within the cam track 40 as the pin 62 traverses the cam track 40, as desired.

An end of the rotating follower 60 opposite the axis of rotation 61 may include a plurality of radially outwardly extending teeth 64 for engaging a rotary component 80 of the kinematics system. The rotary component 80 is shown in FIG. 3 as being substantially gear-like and includes an axis of rotation 81 and a plurality of radially outwardly extending teeth 84 formed along a portion of an outer circumferential surface 83 thereof and configured to engage the teeth 64 of the rotating follower 60. The rotary component 80 may for example be coupled to one of the control doors 4, 5, 6, 7 of FIG. 1 to cause rotation of the one of the control doors 4, 5, 6, 7 as a result of a rotating of the rotating follower 60 during rotation of the cam 20 about the axis of rotation 30 thereof.

The rotating follower 60 is not limited to the general configuration shown and described with reference to FIG. 3. In some embodiments, the rotation of the rotating follower 60 about the axis of rotation 61 thereof may be transferred to linear translational motion through any known combination of kinematics components. Still, in other embodiments, the rotating follower 60 may more closely resemble a gear that may have a circular perimeter shape and teeth suitable for engaging more than one secondary component of the kinematics system.

In use, the pin 62 of the rotating follower 60 traverses the cam track 40 during rotation of the cam 20 about the axis of rotation 30 thereof. With reference to FIG. 3, the pin 62 may be initially positioned at the first end 41 of the cam track 40 within the first segment 51 thereof. An initial rotation of the cam 20 in a first rotary direction (clockwise as shown in FIG. 3) causes the pin 62 to traverse the cam track 40 in a direction away from the first end 41 of the cam track 40 and towards the second segment 52 thereof. The rotating follower 60 does not rotate about the axis of rotation 61 thereof while the pin 62 traverses the first segment 51 of the cam track 40 due to the first segment 51 being spaced the constant distance $D_1$ from the axis of rotation 30 of the cam 20, thereby causing the pin 62 to remain substantially stationary while the cam track 40 moves relative to the stationary position of the pin 62. In contrast, once the pin 62 encounters the second segment 52 of the cam track 40 having the variable and decreasing distance from the axis of rotation 30 of the cam 20, the pin 62 will be urged by the cam 20 in a radially inward direction towards the axis of rotation 30 of the cam 20 during continued rotation of the cam 20 in the first rotary direction. The rotating follower 60 in turn rotates about the axis of rotation 61 thereof in a second rotary direction opposite the first rotary direction (counter-clockwise as shown in FIG. 3) as the pin 62 follows the cam track 40 during rotation of the cam 20. The rotation of the rotating follower 60 in the second rotary direction causes the teeth 64 of the rotating follower 60 to engage the teeth 84 of the rotary component 80 to rotate the rotary component 80 about the axis of rotation 81 thereof in the first rotary direction.

As the pin 62 continues to traverse the cam track 40 while the cam 20 rotates in the first rotary direction, the rotating follower 60 either remains stationary or rotates about the axis of rotation 61 thereof in one of the first rotary direction or the second rotary direction depending on the changing distance of the cam track 40 from the axis of rotation 30 of the cam 20. For example, continued rotation of the cam 20 in the first rotary direction leads to the pin 62 remaining substantially stationary while traversing the third segment 53, moving radially outwardly while traversing the fourth segment 54, remaining substantially stationary while traversing the fifth segment 55, moving radially inwardly while traversing the sixth segment 56, and remaining substantially stationary while traversing the seventh segment 57. During rotation of the cam 20 in the first rotary direction, the segments in which the cam track 40 extends radially inwardly cause rotation of the rotating follower 60 in the second rotary direction to in turn rotate the rotary component 80 in the first rotary direction while the segments in which the cam track 40 extends radially outwardly cause rotation of the rotating follower 60 in the first rotary direction to in turn rotate the rotary component 80 in the second rotary direction.

It is understood by one skilled in the art that rotation of the cam 20 in the opposing second rotary direction will result in the rotating follower 60 and the rotary component 80 rotating in opposing directions when the pin 62 traverses the various different segments 51, 52, 53, 54, 55, 56, 57 of the cam track 40. It is further understood that the cam 20 may be caused to rotate through any angle of rotation in either of the first rotary direction or the second rotary direction to selectively reposition the rotating follower 60 and any other components kinematically linked in the rotating follower 60 such as the rotary component 80 or one of the control doors 4, 5, 6, 7 illustrated in FIG. 1.

It should also be understood that the cam track 40 may have a shape and configuration different from that shown in FIGS. 2-4 depending on the desired degree of motion and timing of the motion of the rotating follower 60. For example, the cam track 40 may include more or fewer of the segments and the segments may extend through different degrees of rotation of the cam, as desired. The cam track 40 shown in FIGS. 2-4 is merely exemplary in nature and is not intended to limit the present invention to the configuration shown and described.

The sliding follower 70 is configured to translate in one of two opposing directions relative to a stationary component 85. The sliding follower 70 is shown as including two spaced apart slots 72 extending in a direction parallel to the direction of translation of the sliding follower 70, wherein each of the slots 72 respectively receives a pin 86 extending from the stationary component 85. However, alternative mechanisms or configurations for translating the sliding follower 70 may be used without departing from the scope of the present invention, such as disposing the sliding follower 70 within a longitudinally extending opening formed in the stationary component 85 configured to cause the sliding follower 70 to translate primarily in two opposing directions parallel to the longitudinal dimension of the opening.

A first end 73 of the sliding follower 70 includes a pin 75 configured to be received in the cam track 40 of the cam 20. The pin 75 may be configured to slidably engage the cam track 40 or the pin 75 may be configured to roll within the cam track 40, as desired. A second end 74 of the sliding follower 70 may be coupled to another component (not shown) of the kinematics system requiring translation in a linear direction. The component may for example form a portion of a sliding control door configured to slide to variably block the flow of the air through one of the vent conduits 11, 12, 13 of FIG. 1, wherein the sliding control door replaces one of the mode control doors 5, 6, 7, as one non-limiting example. It is further understood that the linear translation of the sliding follower 70 may be transferred to alternative components of the kinematics system without departing from the scope of the present invention.

The sliding follower 70 operates in substantially the same manner as the rotating follower 60 except the motion of the pin 75 of the sliding follower 70 results in a linear translation of the sliding follower 70 as opposed to the rotating of the rotating follower 60. More specifically, a distance of the pin 75 from the axis of rotation 30 of the cam 20 varies between the first distance $D_1$ and the second distance $D_2$ depending on which segment 51, 52, 53, 54, 55, 56, 57 of the cam track 40 the pin 75 is traversing, thereby causing the remainder of the sliding follower 70 to move back-and-forth in opposing rectilinear directions (horizontal directions as shown in FIG. 4) to translate the rectilinear motion of the sliding follower 70 to a secondary component coupled to the second end 74 of the sliding follower 70.

Figure 5:
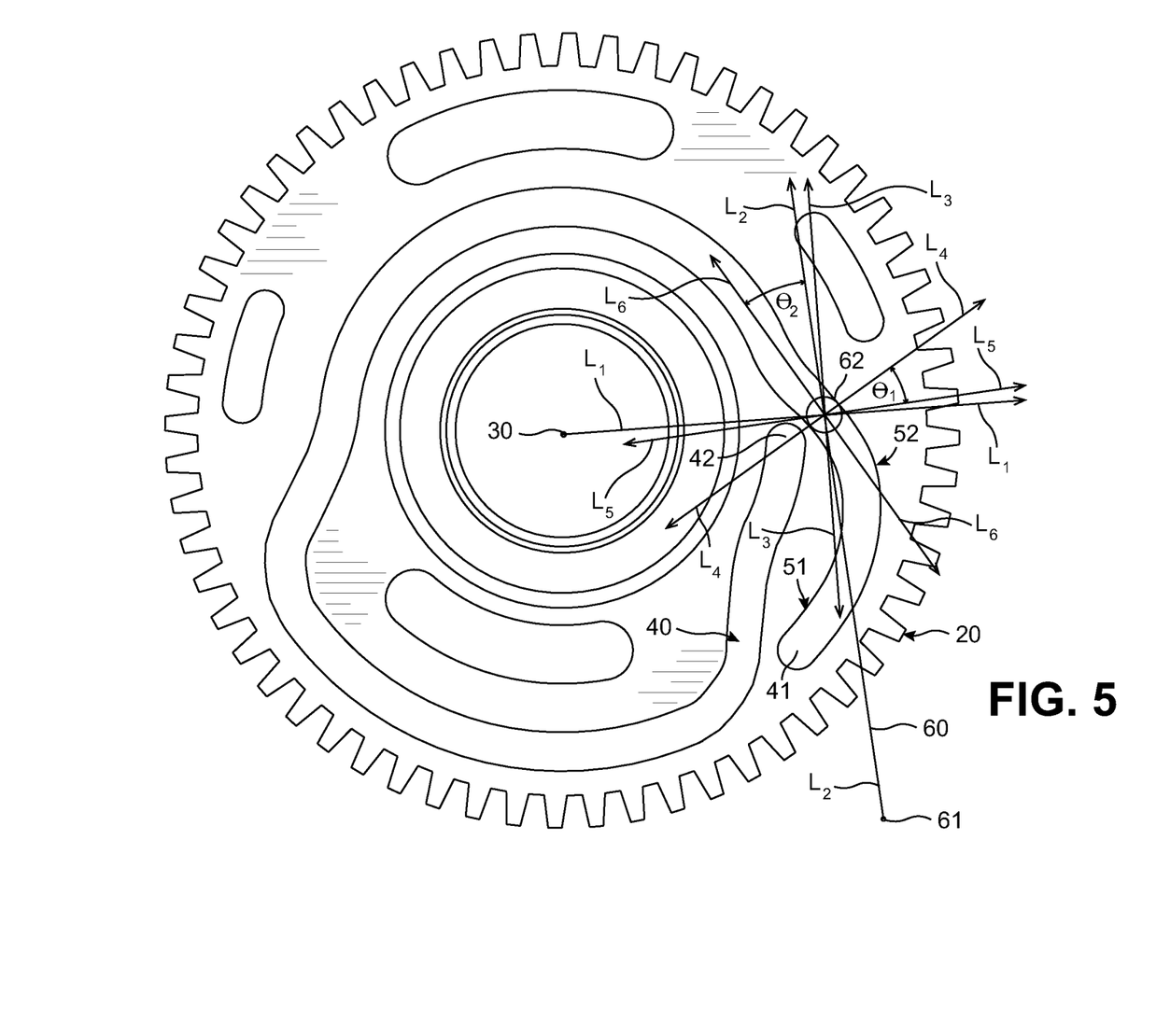
FIG. 5 is a front elevational view showing a relationship between the cam of FIG. 2 and a schematic version of the rotating follower of FIG. 3.

FIG. 5 illustrates the advantages of the cam 20 having the cam track 40 extending circumferentially through more than 360 degrees of angular displacement relative to the axis of rotation 30 thereof. FIG. 5 illustrates a general configuration of the embodiment of the kinematics system shown in FIG. 3 having the rotating follower 60 engaging the cam track 40 of the cam 20 with the rotating follower 60 shown in schematic form to better illustrate the interaction between the cam track 40 and the pin 62 of the rotating follower 60. The cam 20 is rotated about 30 degrees from the position shown in FIGS. 2-4 to place the pin 62 of the rotating follower 60 within the second segment 52 wherein the cam track 40 is urging the pin 62 in a direction at least partially towards the axis of rotation 30 of the cam 20 when the cam 20 rotates in the first rotary direction.

A first line $L_1$ extends from the axis of rotation 30 of the cam 20 through the instantaneous position of the pin 62 of the rotating follower 60 as well as a second line $L_2$ extending from the axis of rotation 61 of the rotating follower 60 through the instantaneous position of the pin 62. A positioning of the cam 20 relative to the rotating follower 60 is preferably selected in a manner wherein the first line $L_1$ and the second line $L_2$ remain substantially perpendicular to each other throughout the rotation of the cam 20 in order to ensure that the movement of the pin 62 during rotation of the rotating follower 60 is primarily in a direction towards or away from the axis of rotation 30 of the cam 20. The position of the axis of rotation 61 of the rotating follower 60 may be selected wherein the first line L1 is arranged perpendicular to the second L2 for at least one possible position of the pin 62 within the cam track 40. A third line $L_3$ extends from the instantaneous position of the pin 62 perpendicular to the first line $L_1$ and represents the opposing tangential directions of the cam 20 at the position of the pin 62. The third line $L_3$ therefore represents the possible instantaneous directions of motion of the pin 62 within the cam track 40 if the segment of the cam track 40 having the pin 62 were to have a constant distance from the axis of rotation 30 of the cam 20 rather than turning radially inwards or radially outwards with respect to the axis of rotation 30. A fourth line $L_4$ extends in a direction of the forces present between the cam 20 and the pin 62 caused by the motion of the cam 20 relative to the pin 62. A fifth line $L_5$ extends through the instantaneous position of the pin 62 and represents the two opposing instantaneous directions the pin 62 may move due to the rotation of the rotating follower 60 about the axis of rotation 61 thereof.

An angle $\theta_1$ formed between the fourth line $L_4$ and the fifth line $L_5$ represents the pressure angle formed between the cam 20 and the pin 62. The angular offset present between the direction of force applied to the pin 62 and the actual direction of motion of the pin 62 causes at least a portion of the force applied to the pin 62 to be directed in an axial direction of the rotating follower 60 extending between the pin 62 and the axis of rotation 61 thereof, wherein this axially directed force does not aid in repositioning the pin 62 within the cam track 40 by rotating the rotating follower 60 about the axis of rotation 61 thereof. As such, it is beneficial to minimize the magnitude of the pressure angle present between the cam 20 and the pin 62 to ensure that the torque applied to the cam 20 to rotate the cam 20 about the axis of rotation 30 thereof is most efficiently transferred to other components of the kinematics system, thereby reducing the amount of torque required to operate the entirety of the kinematics system having the cam 20.

A sixth line $L_6$ extends through the instantaneous position of the pin 62 and extends in an instantaneous direction of extension of the cam track 40 at the position of the pin 62. An angle $\theta_2$ formed between the third line $L_3$ and the sixth line $L_6$ is equal to the pressure angle $\theta_1$ formed between the fourth line $L_4$ and the fifth line $L_5$. As such, it is apparent from a review of FIG. 5 that a selection of a slope of the sixth line $L_6$ relative to a direction of extension of the third line $L_3$ is directly affects the pressure angle formed between the cam 20 and the pin 62.

It is therefore beneficial to minimize the extent to which the cam track 40 extends radially inwardly or radially outwardly through a given angle of rotation of the cam 20 to prevent the incidence of pressure angles greater than a predetermined maximum value, which could be 25 degrees, 30 degrees, or 35 degrees, as non-limiting examples. Assuming the same general configuration of the cam 20 relative to the rotating follower 60 as shown in FIG. 5, a cam track 40 extending circumferentially through a greater angle of rotation relative to the axis of rotation 30 thereof is able to achieve the same motions of the pin 62 while doing so more gradually and with a smaller angle present between the tangential direction of the cam 20 at the position of the pin 62 and the direction of extension of the cam track 40 at the position of the pin 62, thereby also leading to smaller pressure angles present between the cam 20 and the pin 62. In other words, the cam track 40 may effectively be lengthened in the circumferential direction of the cam 20 in a manner wherein the same movement of the pin 62 towards or away from the axis of rotation 30 of the cam 20 may be accomplished by rotating the cam through a greater angle of rotation thereof, which results in the pin 62 traversing a greater length of the cam track 40 for the same degree of radial inward or outward movement of the pin 62. This relationship effectively allows for the component of the force acting on the pin 62 in an axial direction of the rotating follower 60 to be reduced in comparison to a cam track prescribing the same motion through a smaller degree of rotation of the cam 20, thereby reducing the amount of torque required to effectively drive the cam 20 about the axis of rotation 30 thereof.

The inclusion of a cam track 40 extending circumferentially through more than 360 degrees presents the need for positive end stops to be employed in order to prevent excessive rotation of the cam 20 and to stop the follower engaging the cam track 40 from displacement from the cam track 40. The phrase positive end stop refers to a feature of the cam 20 or the associated kinematics system causing the cam 20 to discontinue rotation in one of the first rotary direction or the second rotary direction once the pin 62 has traversed the desired length of the cam track 40 during a desired rotation of the cam 20 about the axis of rotation 30 thereof.

The cam track 40 illustrated in FIGS. 2-5 includes a positive end stop at each end thereof 41, 42, wherein each of the positive end stops is formed by a surface of the cam 20 at the end of the slot forming the cam track 40 for preventing continued motion of the pin 62 beyond the ends 41, 42 of the cam track 40. In the embodiment shown, the positive ends stops are displaced from each other by the 400 degrees of angular displacement of the cam track 40 relative to the axis of rotation 30 of the cam 20, but any angular displacement may be used without departing from the scope of the present invention. It should be understood that the cam track 40 may be formed to extend through any degree of angular displacement so long as the cam track 40 does not cross itself in a manner disrupting the guidance of the pin 62 through the cam track 40, including extending through angles greater than 720 degrees, for example. The cam track 40 may for example be formed in a manner wherein a line extending radially outwardly from the axis of rotation 30 of the cam 20 may pass through three or more of the segments of the cam track 40.

FIG. 6 illustrates an additional form of positive end stop that may be used in conjunction with the positive end stops formed at the ends 41, 42 of the cam track 40. The second major surface 24 of the cam 20 is shown as including an axially extending collar 36 having a gear-like configuration. The collar 36 is cylindrical in shape and includes a plurality of radially outwardly extending teeth 37 configured for engaging a secondary gear 90. The collar 36 may alternatively extend from the first major surface 22 having the cam track 40 formed therein, as desired, so long as the collar 36 does not interfere with the operation of the follower engaging the cam track 40. Additionally, it is understood that any form of cylindrical surface having teeth extending around an entirety of the circumference thereof may be used in place of the axially extending collar, so long as the cylindrical surface is disposed concentrically with respect of the axis of rotation 30 of the cam 20.

The secondary gear 90 is substantially cylindrical in shape and includes a plurality of teeth 92 extending radially outwardly from a first portion 93 of an outer circumferential surface 95 thereof and configured to engage the teeth 37 of the collar 36. The secondary gear 90 further includes a second portion 94 devoid of the teeth 92 and configured to not engage the teeth 37 of the collar 36. The secondary gear 90 is configured to rotate about an axis of rotation 91 thereof. The first portion 93 is shown in FIG. 6 as extending circumferentially through about 315 degrees of angular displacement with respect of the axis of rotation 91 of the secondary gear 90 while the second portion 94 is shown as extending through about 45 degrees of angular displacement with respect of the axis of rotation 91 of the secondary 90, but it is understood that the first portion 93 and the second portion 94 may cover alternative percentages of the outer circumferential surface 95 of the secondary gear 90 without departing from the scope of the present invention.

The secondary gear 90 is configured to drive the rotation of the cam 20 via rotation of the secondary gear 90 about the rotational axis 91 thereof. The secondary gear 90 may be directly mechanically coupled to an actuator of the kinematics system or the secondary gear 90 may be driven by additional kinematics components operatively disposed between the secondary gear 90 and the actuator, as desired.

The secondary gear 90 includes positive end stops 97 at each end of the first portion 93 of the outer circumferential surface 91 of the secondary gear 90 having the teeth 92. As the secondary gear 90 is rotated relative to the collar 36, each end of the first portion 93 forming one of the positive end stops 97 will include an outermost one of the teeth 92 disengaging from the teeth 37 of the collar 36, thereby ceasing rotation of the cam 20. One of the positive end stops 97 may correspond to a movement of the pin of an associated follower adjacent the first end 41 of the cam track 40 while the opposing positive end stop 97 may correspond to a movement of the pin adjacent the second end 42 of the cam track 40.

The collar 36 and the secondary gear 90 may each be dimensioned to provide a desired gear ratio therebetween for prescribing a timing of the rotation of the cam 20. The secondary gear 90 may for example be selected to have a larger diameter than the collar 36 to ensure that the secondary gear 90 can be formed with the second portion 94 devoid of the teeth 92 while still maintaining a desired relationship between the rotation of the collar 36 in response to the rotation of the secondary gear 90.

The secondary gear 90 having a larger diameter than the collar 36 results in the secondary gear 90 having to undergo less rotation to cause the same degree of rotation of the collar 36 and the remainder of the cam 20. The gear ratio formed between the collar 36 and the secondary gear 90 may also be selected to prescribe a desired timing of the traversal of the cam track 40 by the pin of the associated follower. The gear ratio may be selected to cause the cam 20 to rotate through a greater degree of rotation for every degree of rotation of the secondary gear 90 to speed up the traversal of the cam track 40 by the pin. The increased speed of the pin in traversing the cam track 40 accounts for the additional length of the cam track 40 extending circumferentially through more than 360 degrees of angular displacement in order to meet the timing requirements of any kinematics system having the cam 20.

The kinematics system may employ any number of the cams 20 without departing from the scope of the present invention. For example, the actuator of the kinematics system may be operatively coupled to a plurality of secondary gears wherein each of the secondary gears is responsible for rotating one of the cams 20. It is further understood that the cam 20 may be formed with more than one of the cam tracks 40 for receiving a portion of a follower or the cam track 40 may be configured to receive a portion of more than one follower without necessarily departing from the scope of the present invention. As mentioned previously, the cam 20 and the cam track 40 extending through more than 360 degrees of angular displacement may be adapted for any application in need of a more efficient transfer of motion from one component to another.

Advantageously, when the rotation of the cam 20 is increased to angles that are equal to or greater than 360 degrees, pressure angle magnitudes present between the pin of the follower and the cam 20 are minimized. Minimized pressure angle magnitudes result in minimized torque requirements of the actuator used to drive the kinematics system, which may be adapted for controlling a plurality of control doors of an HVAC system. As a result, minimized torque requirements permit for the HVAC system to be operationally optimized and can include control doors with any variety of different styles other than the exclusive use of center pivot style doors. With minimized torque, actuator NVH is minimized and design robustness of the HVAC system is improved. Desirably, with such systems, the use of two or more actuators is avoided, time requirements of the doors 4, 5, 6, 7 are maintained, and cost and complexity of manufacturing is minimized.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A cam for a kinematics system driven by an actuator, the cam comprising:

a plate configured to rotate about an axis of rotation thereof, a cam track formed in the plate as a slot extending from a first end to a second end, the cam track extending circumferentially through more than 360 degrees of angular displacement relative to the axis of rotation of the plate, wherein the cam track includes a plurality of segments having a constant distance from the axis of rotation of the plate and a plurality of segments having a variable distance from the axis of rotation of the plate, wherein a first portion of the cam track is spaced apart from and disposed directly radially outwardly of a second portion of the cam track relative to the axis of rotation of the plate, wherein the first portion of the cam track includes a first segment of the cam track having the variable distance from the axis of rotation of the plate and a first segment of the cam track having the constant distance from the axis of rotation of the plate, wherein the second portion of the cam track includes a second segment of the cam track having the variable distance from the axis of rotation of the plate and a second segment of the cam track having the constant distance from the axis of rotation of the plate, wherein the first segment of the cam track having the constant distance from the axis of rotation of the plate includes the first end of the cam track and the second segment of the cam track having the constant distance from the axis of rotation of the plate includes the second of the cam track, wherein a first line extending radially outwardly from the axis of rotation of the plate passes through each of the first segment of the cam track having the variable distance from the axis of rotation of the plate and the second segment of the cam track having the constant distance from the axis of rotation of the plate, and wherein a second line extending radially outwardly from the axis of rotation of the plate passes through each of the first segment of the cam track having the constant distance from the axis of rotation of the plate and the second segment of the cam track having the variable distance from the axis of rotation of the plate.

2. The cam of claim 1, wherein the cam track is configured to receive a portion of a follower.

3. The cam of claim 1, wherein the cam track extends circumferentially through at least 400 degrees of angular displacement relative to the axis of rotation of the plate.

4. The cam of claim 1, wherein the plate includes a cylindrical surface, an entirety of a circumference of the cylindrical surface having teeth extending therefrom, the teeth of the cylindrical surface configured to engage a gear of the kinematics system.

5. A kinematics system driven by an actuator, the kinematics system comprising:
a cam configured to rotate about an axis of rotation thereof, a cam track formed in the cam as a slot extending from a first end to a second end, the cam track extending circumferentially through more than 360 degrees of angular displacement relative to the axis of rotation of the cam, wherein the cam track includes a plurality of segments having a constant distance from the axis of rotation of the cam and a plurality of segments having a variable distance from the axis of rotation of the cam, wherein a first portion of the cam track is spaced apart from and disposed directly radially outwardly of a second portion of the cam track relative to the axis of rotation of the cam, and wherein the first portion of the cam track includes a first segment of the cam track having the variable distance from the axis of rotation of the cam and a first segment of the cam track having the constant distance from the axis of rotation of the cam, wherein the second portion of the cam track includes a second segment of the cam track having the variable distance from the axis of rotation of the cam and a second segment of the cam track having the constant distance from the axis of rotation of the cam, wherein the first segment of the cam track having the constant distance from the axis of rotation of the cam includes the first end of the cam track and the second segment of the cam track having the constant distance from the axis of rotation of the cam includes the second of the cam track, wherein a first line extending radially outwardly from the axis of rotation of the cam passes through each of the first segment of the cam track having the variable distance from the axis of rotation of the cam and the second segment of the cam track having the constant distance from the axis of rotation of the cam, and wherein a second line extending radially outwardly from the axis of rotation of the cam passes through each of the first segment of the cam track having the constant distance from the axis of rotation of the cam and the second segment of the cam track having the variable distance from the axis of rotation of the cam; and
a follower having a pin slidably disposed in the cam track of the cam, wherein a first direction extending between an axis of rotation of the follower and a position of the pin is arranged perpendicular to a second direction extending between the axis of rotation of the cam and the position of the pin for at least one possible position of the pin within the cam track.

6. The kinematics system of claim 5, wherein the follower rotates about the axis of rotation of the follower and the pin is spaced from the axis of rotation of the follower.

7. The kinematics system of claim 6, wherein a surface of the follower distal from the axis of rotation thereof includes a plurality of teeth.

8. The kinematics system of claim 7, wherein the teeth of the follower engage teeth of a rotary component.

9. The kinematics system of claim 8, wherein the rotary component is operatively coupled to a control door of a heating, ventilating, and air conditioning system of a motor vehicle.

10. The kinematics system of claim 5, wherein the cam includes a cylindrical surface, an entirety of a circumference of the cylindrical surface having teeth extending therefrom, the teeth of the cylindrical surface configured to engage a gear.

11. The kinematics system of claim 10, wherein the gear includes teeth formed around only a portion of a circumference of the gear to establish positive ends stops for the rotation of the cam at each end of the portion of the circumference of the gear.

12. The kinematics system of claim 10, wherein the gear has a diameter larger than a diameter of the cylindrical surface of the cam.

13. A heating, ventilating, and air conditioning system of a motor vehicle comprising:
a plurality of control doors;
an actuator;
a cam for transferring torque generated by the actuator to at least one of the control doors, the cam configured to rotate about an axis of rotation thereof, a cam track formed in the cam as a slot extending from a first end to a second end, the cam track extending circumferentially through more than 360 degrees of angular displacement relative to the axis of rotation of the cam, wherein the cam track includes having a constant distance from the axis of rotation of the cam and a plurality of segments having a variable distance from the axis of rotation of the cam, wherein a first portion of the cam track is spaced apart from and disposed directly radially outwardly of a second portion of the cam track relative to the axis of rotation of the cam, and wherein the first portion of the cam track includes a first segment of the cam track having the variable distance from the axis of rotation of the cam and a first segment of the cam track having the constant distance from the axis of rotation of the cam, wherein the second portion of the cam track includes a second segment of the cam track having the variable distance from the axis of rotation of the cam and a second segment of the cam track having the constant distance from the axis of rotation of the cam, wherein the first segment of the cam track having the constant distance from the axis of rotation of the cam includes the first end of the cam track and the second segment of the cam track having the constant distance from the axis of rotation of the cam includes the second of the cam track, wherein a first line extending radially outwardly from the axis of rotation of the cam passes through each of the first segment of the cam track having the variable distance from the axis of rotation of the cam and the second segment of the cam track having the constant distance from the axis of rotation of the cam, and wherein a second line extending radially outwardly from the axis of rotation of the cam passes through each of the first segment of the cam track having the constant distance from the axis of rotation of the cam and the second segment of the cam track having the variable distance from the axis of rotation of the cam; and a follower having a pin slidably disposed in the cam track of the cam, wherein a first direction extending between the axis of rotation of the follower and a position of the pin is arranged perpendicular to a second direction extending between the axis of rotation of the cam and the position of the pin for at least one possible position of the pin within the cam track, the at least one possible position disposed within the first segment having the constant distance from the axis of rotation of the cam.

14. The heating, ventilating, and air conditioning system of claim 13, wherein the cam includes a cylindrical surface, an entirety of a circumference of the cylindrical surface having teeth extending therefrom, the teeth of the cylindrical surface configured to engage a gear, the gear including teeth formed around only a portion of a circumference thereof to establish positive ends stops for the rotation of the cam at each end of the portion of the circumference of the gear, the gear having a larger diameter than the cylindrical surface of the cam.

15. The cam of claim 1, wherein a third portion of the cam track is angularly displaced from the first portion and the second portion thereof, the third portion of the cam track including a third segment of the cam track having the variable distance from the axis of rotation of the plate and a third segment of the cam track having the constant distance from the axis of rotation of the plate.

* * * * *